(12) United States Patent	(10) Patent No.:	US 6,743,077 B2
Busenhart	(45) Date of Patent:	*Jun. 1, 2004

(54) WIDE-WHEEL GRINDING MACHINE

(75) Inventor: Peter Busenhart, Wiesendangen (CH)

(73) Assignee: Steinemann Technology AG, St. Galen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/412,265

(22) Filed: Apr. 14, 2003

(65) Prior Publication Data

US 2004/0023604 A1 Feb. 5, 2004

Related U.S. Application Data

(63) Continuation of application No. 09/869,038, filed as application No. PCT/CH99/00626 on Dec. 24, 1999.

(30) Foreign Application Priority Data

Dec. 24, 1998 (CH) .............................................. 2565/98

(51) Int. Cl.[7] ................................................. B24B 1/00
(52) U.S. Cl. ....................................................... 451/40
(58) Field of Search .......................... 451/40, 340, 342, 451/360, 361, 5, 51, 11

(56) References Cited

U.S. PATENT DOCUMENTS

| | | | | |
|---|---|---|---|---|
| 3,387,899 A | * | 6/1968 | Hahn et al. | 384/316 |
| 4,330,962 A | * | 5/1982 | Favrot | 451/72 |
| 4,422,265 A | | 12/1983 | Branston | 51/52 |
| 4,501,093 A | * | 2/1985 | Fisher | 451/5 |
| 4,587,763 A | * | 5/1986 | Hahn | 451/5 |
| 5,359,814 A | | 11/1994 | Baltazar et al. | 451/5 |
| 5,437,125 A | | 8/1995 | Barton | 451/8 |
| 5,531,636 A | | 7/1996 | Bissen | 451/130 |
| 5,890,521 A | | 4/1999 | Dunn | 144/1.1 |
| D447,756 S | | 9/2001 | Wang | D15/124 |
| 6,319,097 B1 | * | 11/2001 | Coverdale et al. | 451/5 |

* cited by examiner

Primary Examiner—Lee D. Wilson
Assistant Examiner—Alvin J. Grant
(74) Attorney, Agent, or Firm—Finnegan, Henderson, Farabow, Garrett & Dunner, L.L.P.

(57) ABSTRACT

The invention relates to a wide-wheel grinding machine having at least one grinding head attached to a machine frame by a cross arm and having a drive motor for the grinding head which is mounted at one end of the cross arm. The machine is made of non-metal castings and damps both the drive and grinding vibrations from the grinding head as close to the source as possible. Multi-head machines are assembled in accordance with the number of grinding heads on the basis of frame modules which are similar in shape.

40 Claims, 8 Drawing Sheets

WIDE-WHEEL GRINDING MACHINE

This is a continuation of application Ser. No. 09/869,038 filed Sep. 7, 2001, which is a 371 of PCT/CH/00626, filed Dec. 24, 1999, both of which are incorporated herein by reference. Application Ser. No. 09/869,038 is pending.

BACKGROUND OF THE INVENTION

1. Field of the Invention

This invention relates to a wide-wheel grinding machine having at least one grinding head attached to a machine frame by a cross arm and having a drive motor for the grinding head which is mounted at one end of the cross arm.

2. Description of Related Art

Wide-wheel grinding machines have been established for several decades as a generic type of grinding machine. These grinding machines are very large, being between 1.5 and 3 meters in height and from one meter to several meters in length, depending on the number of grinding heads. The width of the machine, which may be from one meter to more than three meters, is typical. As a rule, a wide-wheel grinding machine is adapted to the specific needs of the situation, especially the width of the work pieces to be ground. One work piece after the other is guided continuously through the machine. Therefore, in the technical jargon, larger installations are referred to as a grinding line, which includes conveyance toward and away from the grinding machine. A typical application is grinding rough plywood boards. In most cases, the top and bottom surfaces are ground over the entire width simultaneously. Rough plywood boards have an excess thickness of 0.5 mm or more immediately after pressing and should be brought within a thickness' tolerance of at most ±3/100 mm after the grinding operation. The thickness tolerance must be maintained uniformly over the entire surface. A very high surface quality is demanded for the finished ground work piece. Roll pass grinding as the first stage of grinding requires powerful motors for removal of the large quantities of material involved. Accordingly, the enormous grinding work necessitates extremely high precision and stability of the machine, especially the machine frame, when working with boards several square meters in size. In the case of wide-wheel grinding machines, a wide variety of abrasive media are used. This depends first on the type of grinding procedure, whether roll pass grinding, fine grinding or sanding pad grinding. Primarily, grinding belts, grinding drums or brush rollers are used for this purpose. In addition to the above-mentioned grinding of boards, the generic wide-wheel grinding machine is also used in many other areas, e.g., for wood-core plywood boards, doors and also fiber-reinforced plaster, board, cement fiberboard and floor coverings in addition to both hard and soft fiberboard and plywood as well as other laminates and sheet rock, rubber coverings and parquet, cork and straw boards, and also for metal polishing in particular. As a consequence of the variety of different applications, a manufacturer of wide-wheel grinding machines will manufacture two identical machines only in exceptional cases, in contrast with other machine tools. Each machine is tailored to the specific client needs. An attempt is made to standardize the height adjustment of individual structural groups within the machine as much as possible, especially the grinding heads as well as the guide rolls and drive rolls. Nevertheless, actual practice so far has shown that work done in assembling the machines represents a major cost factor. Before a wide-wheel grinding machine can be shipped to a client, it is completely assembled at the manufacturing plant, including the drive and the controller, and all the important functions are tested in a test run. In the state of the art, the great variety of client needs have prevented more extensive standardization. In any case, this invariably included a good or even better quality with respect to the working result. Practice has shown repeatedly that machine vibration is an important factor affecting the quality of the working result. The two dominant vibration sources include the drive on the one hand and the site of the grinding action on the other hand. Resonance phenomena anywhere in the area of the wide-wheel grinding machine constitute a third vibration source which should not be underestimated. Any change in the design of a wide-wheel grinding machine always brings surprises in the matter of machine stability because of the virtual impossibility of calculating everything in advance. Therefore, any change entails risks accordingly. Furthermore, vibration effects of building parts, in particular the floor on which the machine stands, have also been known to occur. Harmful vibrations can be counteracted by a solid concrete floor or foundation. German Utility Model 94 14 952 describes a wide-wheel grinding machine having at least one grinding head mountable by cross arm on a machine frame and a drive motor for the grinding head and having a detachable connection at the other end with respect to the machine frame.

U.S. Pat. No. 5,070,224 and the corresponding German Patent 38 41 413 describe a wire eroding machine where the portal frame may be made of a mineral casting. It is proposed that the portal bridge be designed as an independent module having a cuboid solid body and hollow body. The portal bridge is designed to be replaceable and rigidly connectable to the side walls by means of the connecting devices to permit different machine designs. The object of German Patent 38 41 314 is to create independent, compatible and interchangeable modular units of having different designs with modifiable dimensions by using a modular system so that the units can be assembled to form machine constructions that can be adapted individually to the given processing jobs without impairing the rigidity and vibration resistance of the machine frame.

German Patent 37 34 895 proposes a concrete frame or an internal circular grinding machine to achieve the goal of a uniform mass and rigidity as well as an appropriate cast frame. The concrete frame is designed as a double-T shape in its longitudinal direction, and a peripheral steel frame is integrally cast in the standing surface of the concrete. Steel wire pieces with a diameter of 0.4 to 0.7 mm and a length of approximately 30 mm are preferably added to the cement concrete. The following are mentioned as advantages of the solution according to German Patent 37 894:

The mass of the concrete frame is approximately the same as that of a comparable cast frame and has the same rigidity due to the double-T design.

The thermal capacity of a concrete frame is approximately twice as great as that of a cast frame and its damping effect is three to four times greater.

There is no complicated reinforcement due to the uniform distribution of steel wire pieces in the concrete.

The design of the concrete frame in the form of a double-T shape creates cavities to accommodate machine-specific modules.

Concrete is a disadvantage if changes in the machine concept are necessary later and if permanent connections must be established between the machines frame and the modular components. The difference in thermal expansion of concrete and steel may cause additional problems in specific applications where there are great temperature differences.

SUMMARY OF THE INVENTION

The object and goal of the invention was to find means and methods of developing a low-vibration concept for wide-wheel grinding machines that would allow inexpensive production without sacrificing the quality standards of the machine, in particular the machine stability. An important partial goal was also the possibility of individual adaptability of the wide-wheel grinding machine to clients' specifications.

The wide-wheel grinding machine according to the present invention is characterized in that the machine frame is composed of a mineral casting module and a cross arm with the cross arm being designed as a metal profile and fixedly connected to the mineral casting module at the motor side.

The present inventors have recognized that in the case of the wide-wheel grinding machine, the cross arm supporting the grinding head is advantageously integrated into the concept of the machine frame as a central portion of this generic grinding machine design in general. In state-of-the-art wide-wheel grinding machines, the steel frames are connected to the cross arm by welds or screw connections. In accordance with the present invention, however, an unequal pairing of a mineral casting module with a cross arm made of metal, together form a machine frame. The main advantage of the invention is that the main forces and main vibrations between the mineral casting module and the cross arm are absorbed or damped directly in the near area of the connection within the modular unit they form. The vibrational forces are transferred directly into the mineral casting, which is optimal from the standpoint of damping vibration, by the cross arm on which the grinding heads are supported. This makes it possible to suppress vibration problems caused by vibration close to the source. This makes it possible to prevent harmful vibrations from being transmitted to other structural parts, thus having a negative effect on grinding quality due to a feedback effect. The mineral casting is preferably made of resin, hardener and mineral fillers. The cross arm is preferably designed as a tubular beam and has a non-metallic cast filling on at least the drive end to form a heavy mass, preferably a mineral casting as the filling. The cross arm and mineral casting module can be designed optimally and connected in such a way that they dampen vibration.

For a large number of especially advantageous embodiments, reference is made to claims 3 through 16. The modular design is very interesting and is virtually predestined for a machine design which can be varied in a wide range and is suitable for combination with a mineral casting. Preferably at least the operating side and the motor side are produced as mineral castings. This is the zone where the static and dynamic forces, in particular the vibrational forces, are transmitted to the frame. Due to the essentially known damping effect of a non-metallic casting, the present invention thus makes it possible to very effectively prevent vibration from the grinding operation as well as the vibration which is often caused by surface patterning but is undesirable. This object is achieved in an optimum manner because even when operating at a high throughput, the greatest possible stability is possible for the entire machine. Damping occurs as close to the source of vibration as possible without any increased expense. It is a great advantage that any vibration occurring is transferred as quickly as possible from the site of origin into the largest possible damping mass and is thus rendered largely harmless.

For moderately heavy machines, it is important for the motor side and the operating side, including all the corner areas, to be produced of a mineral casting. The corner areas can be produced in one piece with a portion of the longitudinal walls. However, it is also possible for a module to be formed with the operating side and the motor side each having legs or longitudinal sides of unequal length. The modular design affects the process of manufacturing the machine itself to a very great extent. The present invention permits some leeway inasmuch as the ratio of the amount of mineral casting and metal or steel can be selected and adapted to new requirements at any time. Thus, bottom and/or top parts of a machine housing can be manufactured as a whole in the form of identical and symmetrical mineral castings. To facilitate assembly, but also to increase the allowed load, precision work stations can be integrally cast in the individual modules.

Furthermore, the present invention is based on well-proven mechanical modules because they have been refined to a high degree for actual practice and conform to client needs. However, "Lego construction" can begin at the level of the frame structure or the machine housing structure. The Machine housing itself may be made of non-metallic cast modules according to a modular design. This is true even of the simplest or lightweight wide-wheel grinding machine with only a single grinding head. The new solution does not rule out the possibility of using a single module for two grinding heads. However, the concept of one housing module per grinding head is preferred. The entire machine can be assembled from such modules in the manner of a construction set to comply with any customer's needs. It is important here that mounting sites suitable for the mechanical components be provided on the machine frame so that assembly can be performed in the shortest possible amount of time. A larger machine can be assembled quickly from several individual cast parts with a high precision. The working components are mounted at connecting points that are already arranged precisely. The possibility of modular assembly is derived from this concept. Modular assembly allows each module to be finished at a separate location, and the various mechanical modules can retain a high degree of standardization per se.

The simplest implementation of the new solution according to the present invention uses at least one mineral casting module, where only one side of the work piece is ground. On the other side, a supporting drum with a frame part made of steel according to the state of the art or as a module may be used. If both sides of the work piece are to be ground at the same time, then it is proposed here that both the bottom and top parts be formed by two essentially mirror-image moduless. Accordingly, multi-head machines will have modules of the same shape, depending on the number of grinding heads, together forming a large machine frame accordingly. An entire grinding line can be constructed on this basis. The modules can be combined without interspaces to form a large machine or a grinding line, or they may also be constructed in two parts, for example. A first part may contain grinding heads for toll pass grinding, and a second part may contain grinding heads for fine grinding and sanding pad grinding.

A module forms a solid cubical shape with predominantly flat bordering faces. Flat bordering faces not only give a special effect but also meet extremely high demands from the standpoint of sanitation and cleaning. This results in the smallest possible adhesive faces or contact faces for grinding dust and dirt. Flat faces are easier to clean. The two longitudinal sidewalls are preferably designed as identical mirror-image parts with intermediate pieces in the shape of a bridge head. The individual module may be produced in one piece, i.e., made of a single casting, essentially from solid components in particular with usable hollow spaces to accommodate pipes and cables. Tubular inserts are formed in the cavities in a controlled manner so that pneumatic and hydraulic pipes or electric lines and signal lines can be inserted into them in such a way that they are fully protected. Such cavities can also be used for conducting air. The local mass of the module, and accordingly how the module will behave with respect to damping vibration, can be controlled by selecting appropriate dimensions for the module's exterior and any hollow cavities it may have. If necessary, counterweights may also be added to the module to obtain desired local mass and vibration damping properties.

Another important advantage is obtained when precision mounting sites are integrally molded or permanently cast in or on the individual element. This provides the most important basis for a high-speed method of precision assembly. After casting, the module does not require further processing by hand or by machine in most cases. This yields a great time-sailing result for industrial fabrication. In the case of mineral castings, there is negligible shrinkage after the casting operation due to the high mineral content, especially for the proffered cold casting method, so that precision mounting sites which are used accurately in accordance provide a guarantee of precision. Furthermore, it is proposed that suitable mounting sites be permanently coast in the individual module accordingly for one mounting set each, for perpendicular supporting columns between two module, for guide roller sets and for a main cross arm for a grinding head. All the grinding head modules have the same height, but grinding head modules are designed with different lengths and widths. Standardization of height is important because otherwise it would have a negative effect on the ability to assemble any desired modules. As a rule, a standard width is the aim for the individual module. The standard width is in a transverse plane at right angles to the broad side of the machine as a whole. The possibility of varying the length of individual modules is very important. The length of a module corresponds to the width of the machine. In each application, different processing widths are required for different grinding operations, e.g., 1, 1.5, 2, 2.5 or 3 meters or even more. The width of the machine is determined not only by spatial factors in each specific case but also has a great effect on the price of a machine as a whole. The machine width must be variable, even if only in large increments. It is usually a disadvantage if in introducing a new idea it is also used with the same ideology. Therefore, it is proposed that the grinding head housing modules be usable in combination with frame parts in steel construction.

A mineral casting consisting of resin, hardeners and mineral fillers is preferred according to the present invention. This is a casting material which is already known per se and is used in the field of machine tool manufacture instead of the heavy cast iron parts used in the past. Mineral casting has an ideal vibration damping characteristic which is a major advance in comparison with the steel frames used in the past from the standpoint vibrations emanating from the grinding operation. Mineral castings, however, are lighter than corresponding steel or cast iron frames. However, it may be advantageous in the case of large-scale machines not to make use of the weight advantage in particular. On the contrary, the housing modules maybe be designed to be as solid as possible so that they form a counterweight to frame parts constructed of steel according to the state of the art, for example.

DETAILED DESCRIPTION OF THE INVENTION

Figure 1:
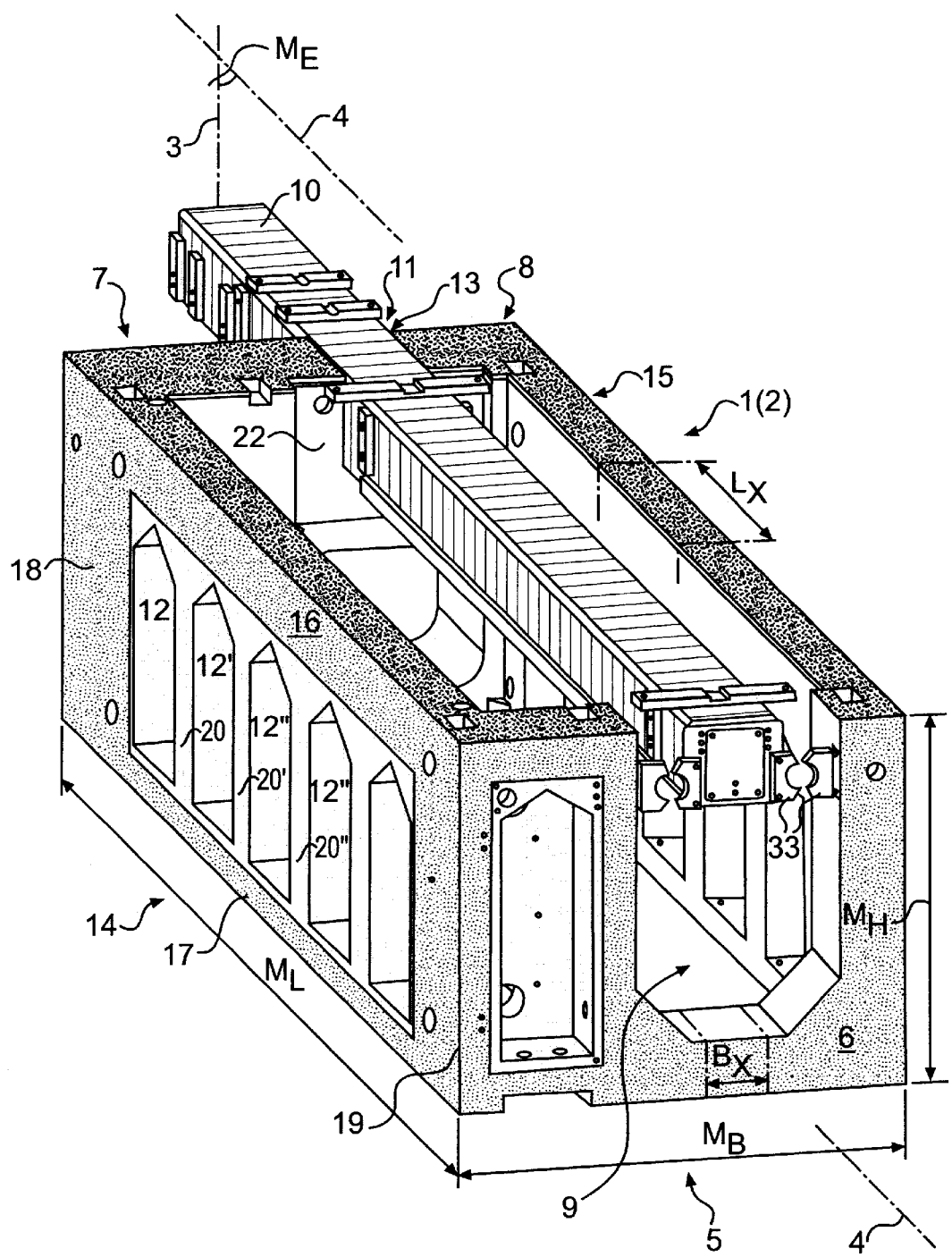
FIG. 1 is a three-dimensional view of an individual machine frame with a mineral casting module and the cross arm anchored permanently.
Figure 7B:
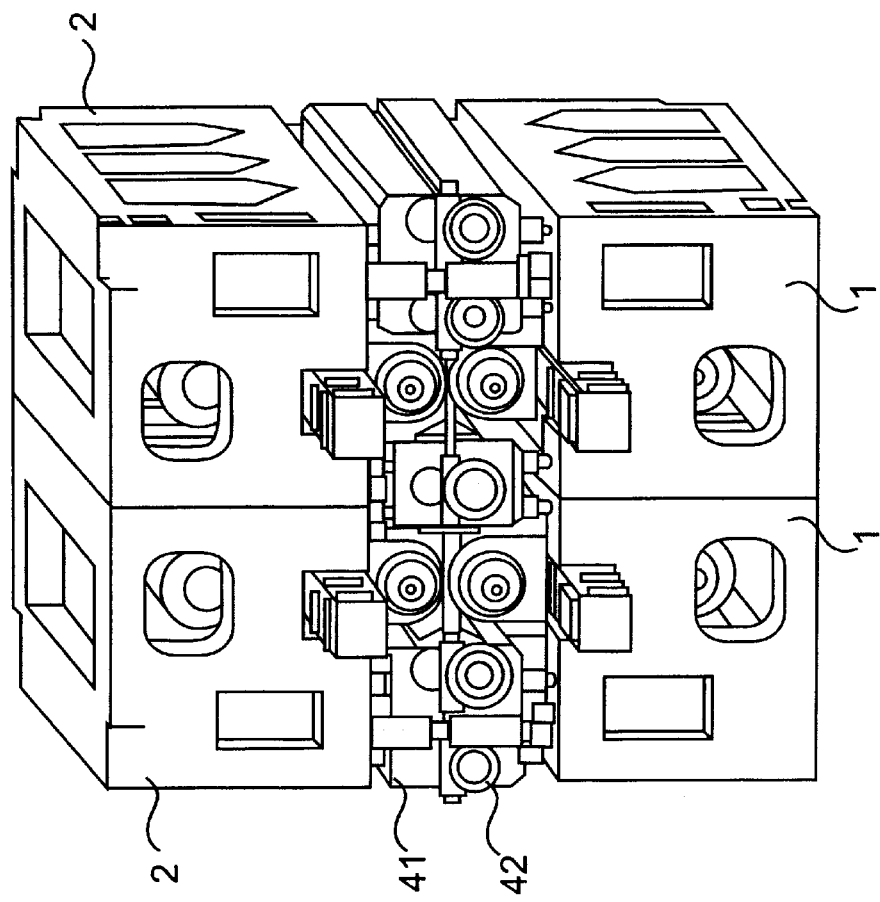
FIG. 7b is a three-dimensional view of the machine in FIG. 7a shown from the rear or the drive side, but without the drive motors.
Figure 7A:
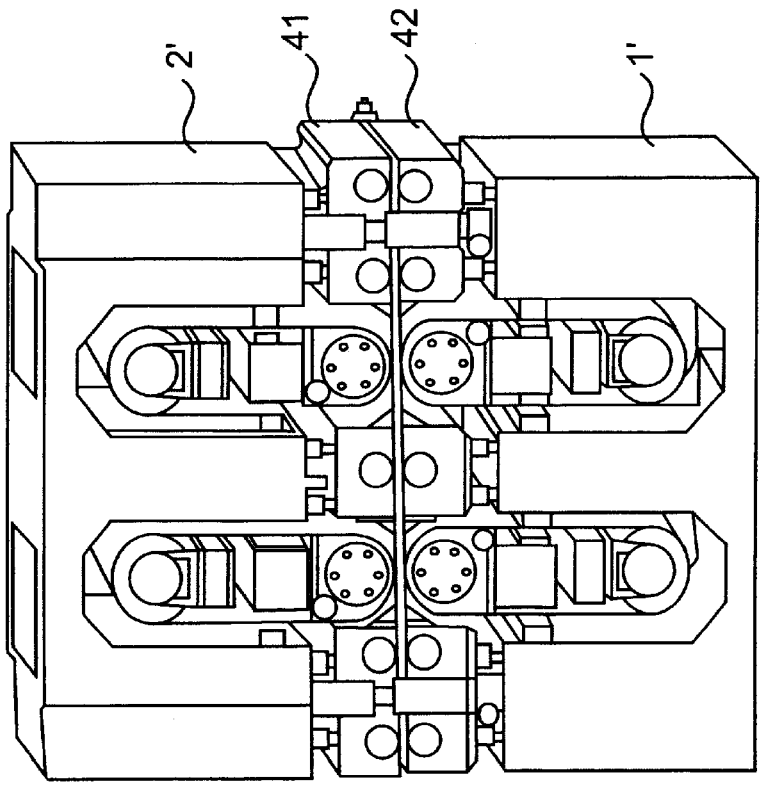
FIG. 7a is a three-dimensional view of an assembled wide-wheel grinding machine for two-sided grinding with two grinding heads, as seen from the operating side.

Reference is made here to FIG. 1, which shows a machine frame 1 (2). Reference number 2 in parentheses indicates a second machine frame which is inverted and is intended for grinding the top sides of boards (FIGS. 7a and 7b). The embodiment in FIG. 1 is symmetrical with respect to a central plane ME which is defined by center lines 3 and 4. The advantage of symmetry is that frame bottom parts 1 and frame top parts 2 can be manufactured as two identical modules, but with the top module rotated by 180 degrees or, in other words, placed on its head or inverted. Thus only one casting mold is needed to produce both modules. Molding costs can be kept low accordingly. The mineral casting module illustrated here is presented in the form of an elongated cubicle shape. It is a medium-width machine with a grinding drum length of approximately 2 meters. In the case of very short grinding drums approximately one meter long, the result tends to be cube shaped because the dimension $M_L$ is only half as large in relation to the embodiment presented here accordingly. A uniform height $M_H$ is preferred. However, in the concrete embodiment selected here, the module width $M_B$ is variable, which is ensured with $B_X$ according to variable intermediate pieces. This is also true accordingly with regard to the module length with a variable length component $L_X$. Arrow 5 indicates the direction of view toward the front panel 6, and arrow 7 is in the direction toward the drive panel or rear panel 8 or the drive end. Front panel 6 is the operating side of the wide-wheel grinding machine. Various access ports are provided on the operating side. The main port is a large central recess 9 through which the belts of continuous grinding belts can be changed. The back panel has a recess 11 which is fixedly anchored and has a cross arm 10 for a grinding head guided in it. Ports 12, 12', 12" etc. shown here have primarily a structural function for machine frame 1 (2). These openings (12) mainly permit savings in terms of casting material. The material distribution shown here also has another function, namely for the arrangement of usable hollow spaces for lines and cables. All possible arrangements of material can be used for the purpose, including both the front panel and back panel as well as the two longitudinal wall parts 14 and 15. In the example show here, the two longitudinal wall parts have a continuous upper beam 16 as well as a bottom beam 17 which are connected to the front panel 6 and the back panel 8 as a casting in one piece in the example shown here by means of corner parts 18 and 19. In the central area, the two longitudinal wall parts 14 and 15 have central supports 20, 20', etc. The mineral casting is assembled on the basis of special plastics from the standpoint of the raw materials. The cross arm 10 in the mineral casting module is preferably anchored directly in the casting operation or by means of a bonded joint 16 which is enlarged to increase the bonding area with a supporting plate 22. The mineral casting module in this figure is cast in one piece, as indicated with spots in the diagram (indicating mineral components). Cross arm 10, however, is filled with metal, or it is a hollow metal section which is preferably filled with a compound. It is important that the connecting area of cross arm 10 is filled with the mineral casting to optimize the vibration damping effect. The cross arm may also be filled completely, preferably with a mineral casting.

Figure 2:
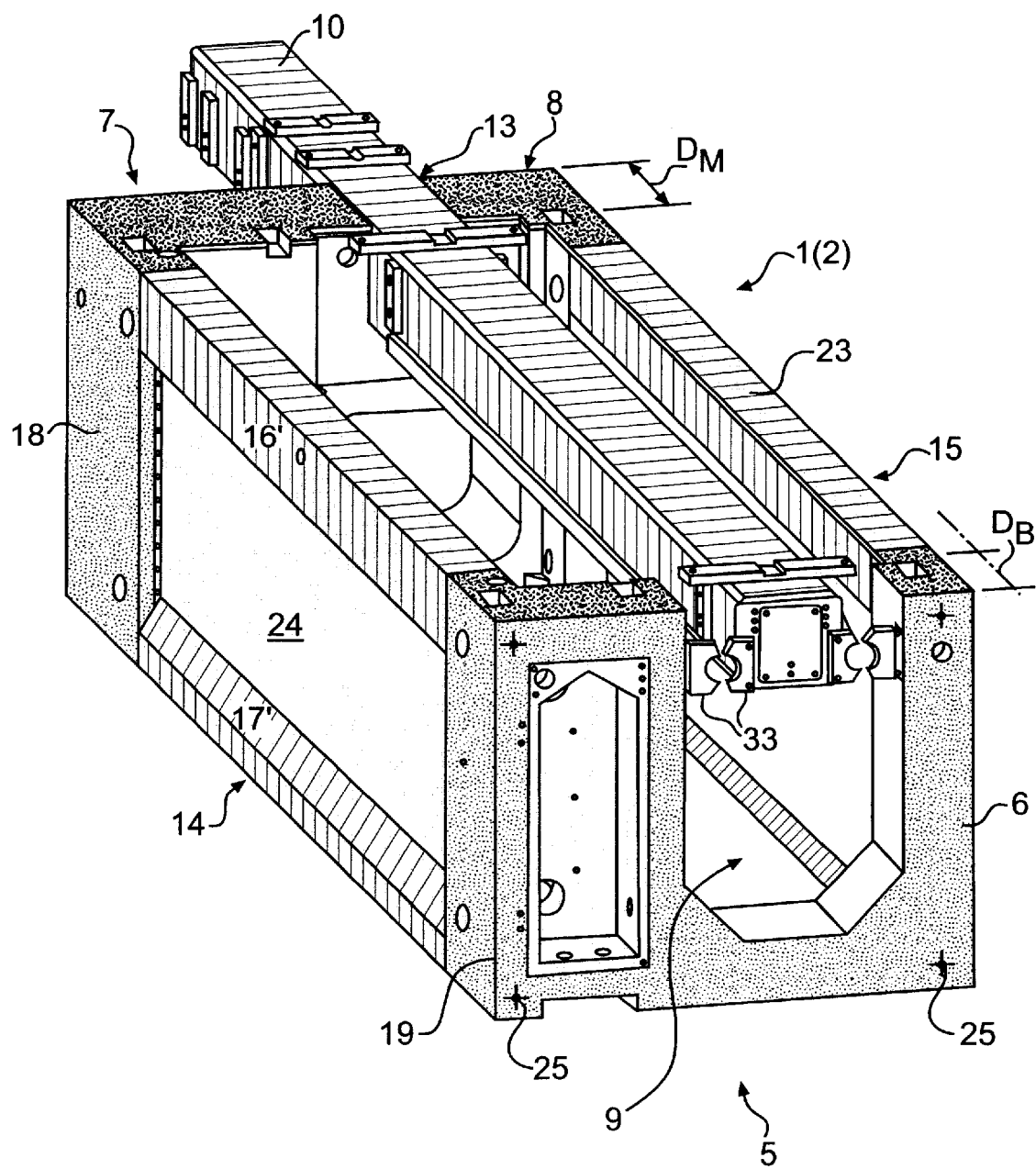
FIG. 2 is a three-dimensional view of a machine frame according to FIG. 1, but with longitudinal walls made of metal.

FIG. 2 shows a slightly modified embodiment of the machine frame. The difference here is that the machine frame is subdivided in a modular manner into three distinct elements. The operating side and the motor side are produced with all their corner parts as mineral castings, but the two longitudinal sides 23 and 24, like the cross arms, are made of steel. It is obvious here that the steel sectional parts may be cast completely or in part as solid parts, preferably as the same or similar mineral castings. The trough-like mold can be joined by means of screws 25. The thickness dimension on the motor side is labeled as DM and the thickness dimension on the operating side is labeled as DB, DM is much larger. This allows twice as much vibration from the grinding process and from the driving forces to be absorbed locally here. An embodiment according to FIG. 1 with a complete mineral casting module is more suitable for extremely large machines, whereas an embodiment according to FIG. 2 is better for lighter weight machines. In both cases, not only are local vibration forces damped, but also complex vibration phenomena acting over a greater space such as those deriving from the drive torque and the grinding belt are rendered especially harmless due to the trough-like shape.

Figure 3:
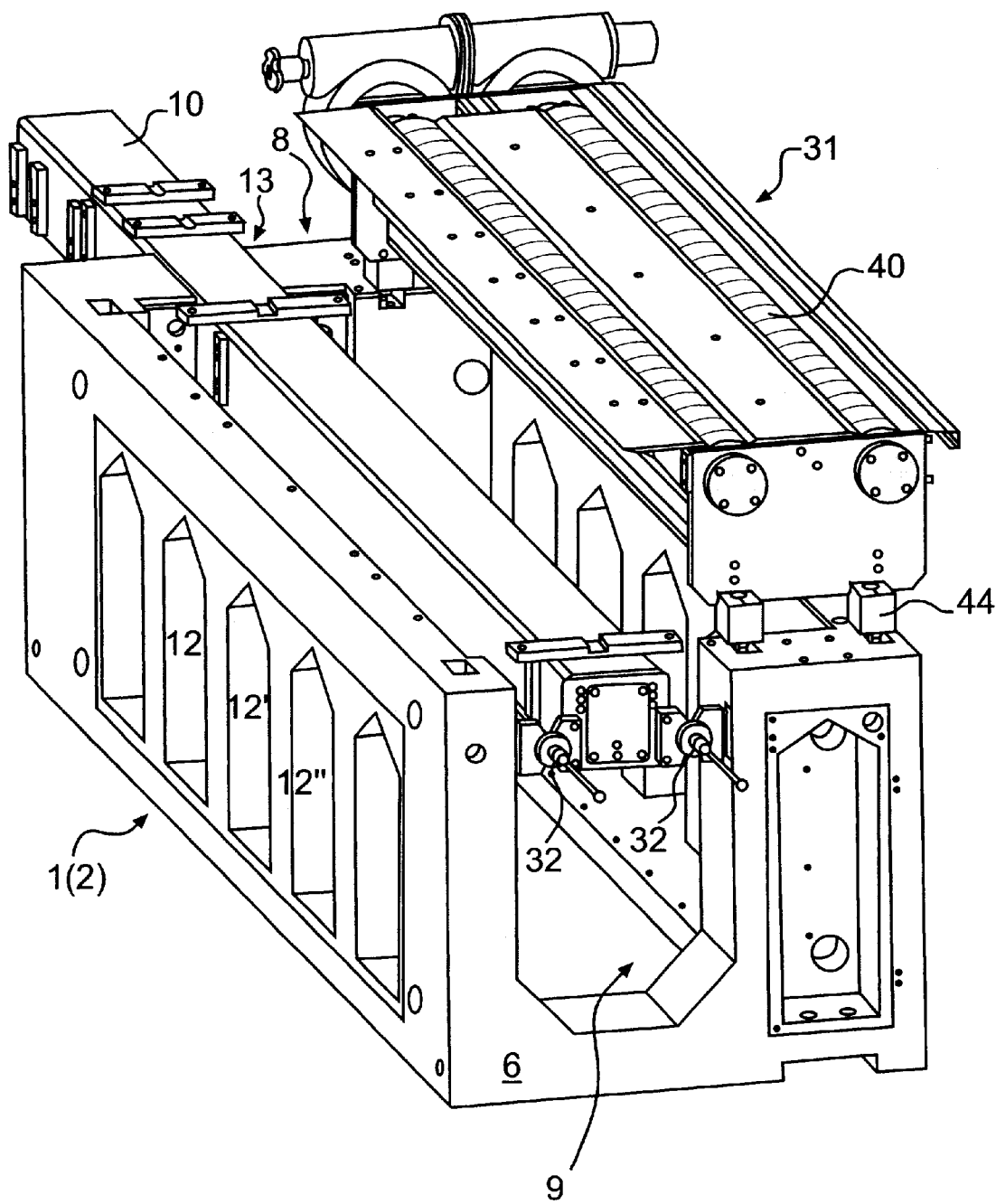
FIG. 3 is a three-dimensional view of a first assembly step for a wide-wheel grinding machine having a module for guide rolls.
Figure 5:
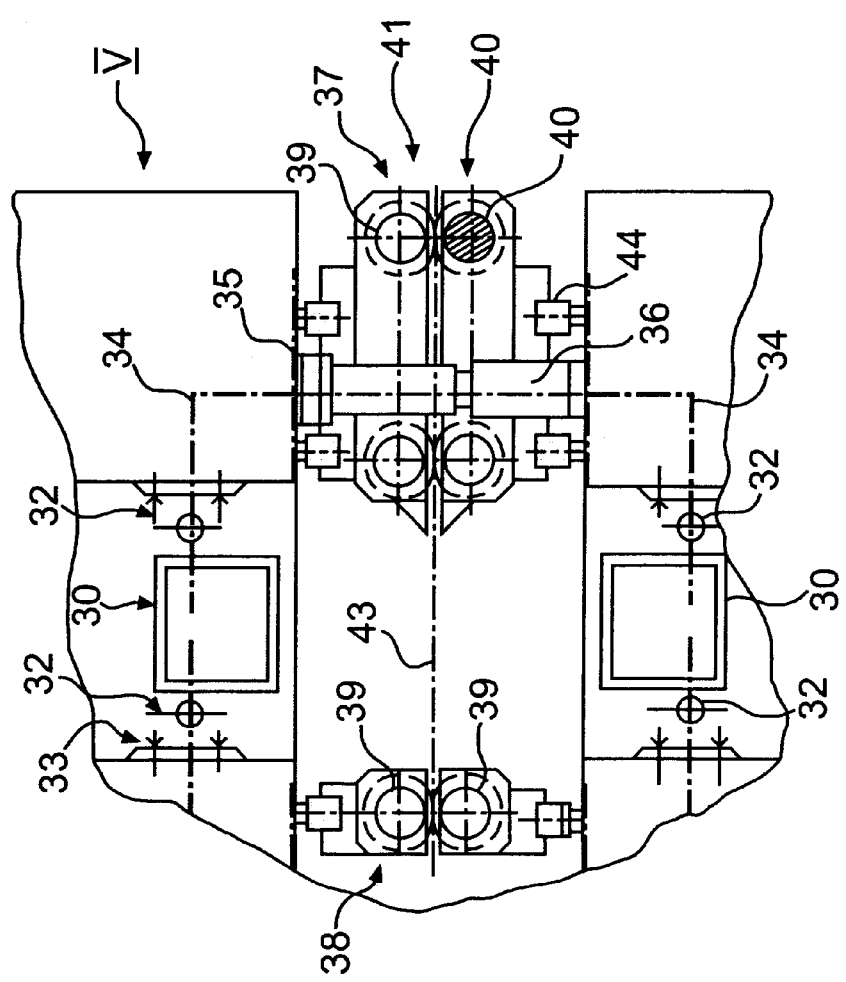
FIG. 5 is a partial side elevation view of a third assembly step with two grinding heads arranged one above the other and held by adjustable supporting columns.

FIG. 3 shows the machine frame which is completely assembled in FIGS. 1 and 2 as the first assembly step, e.g. with the installation of a guide and feed unit 31. Cross arm 10 is fixedly anchored in the housing module 1 (2) in the area of the back panel 8, forming a freely cantilevered arm on both sides. In the area of front panel 6, the main cross arm 30 is attached to the housing module 1 (2) with one anchoring bolt 32 (FIG. 5) on each side for operation. Anchoring bolts 32 must be loosened each time the belt is changed and removed completely so that the continuous belt can be pulled outward and reinserted. The purpose of these anchoring bolts is to support the cross arm at the front and close the U-shaped opening or recess 9 in the housing module 1, 2 forcefully again at the respective location. The mineral casting module 1 (2) is equipped with an integrally cast anchoring point 33, preferably made of metal for this purpose, so that an optimum vibration damping effect is achieved on the operating side as well.

Figure 4:
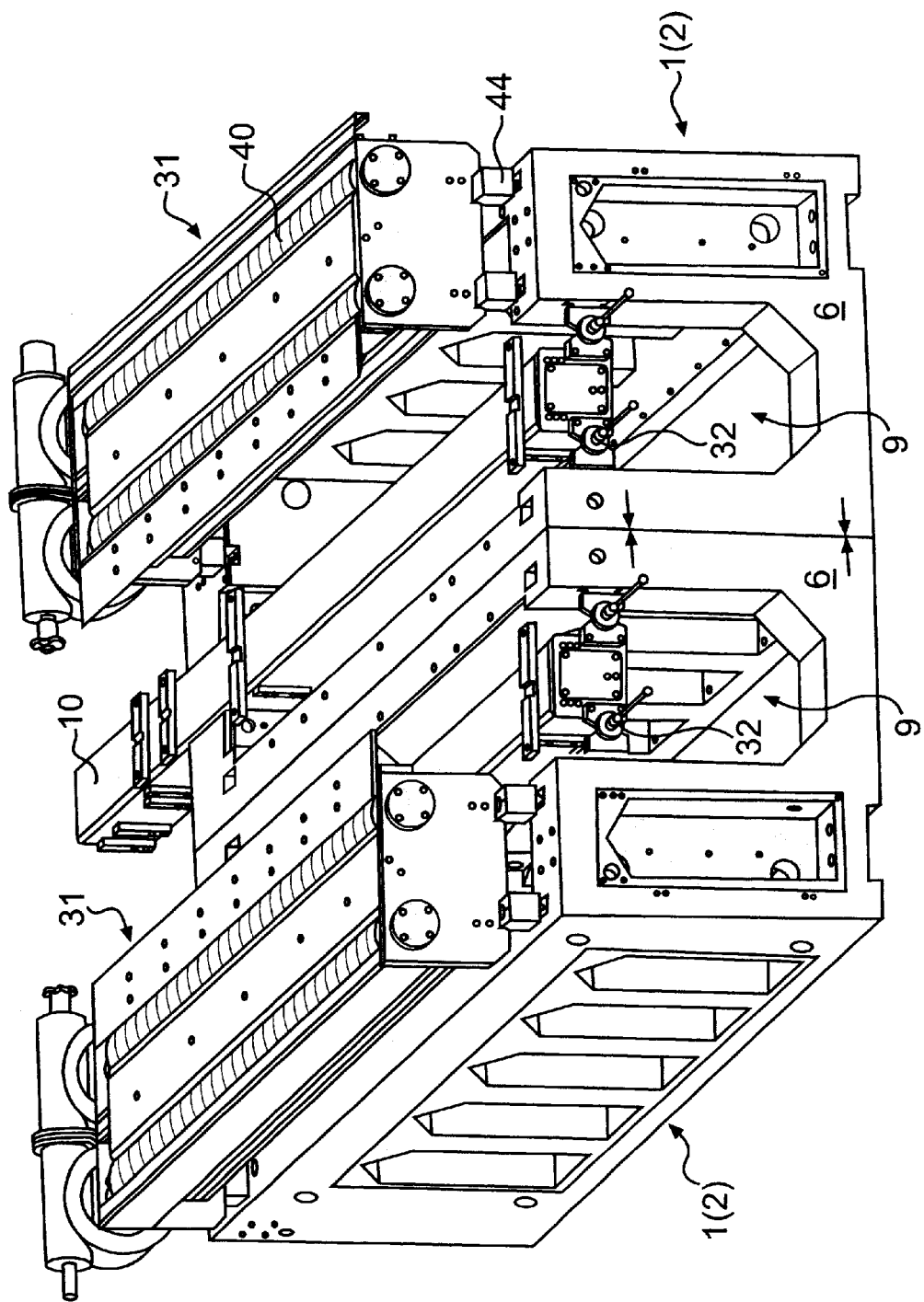
FIG. 4 is a three-dimensional view of a second assembly step with two machine frames and two modules for guide rolls.
Figure 6:
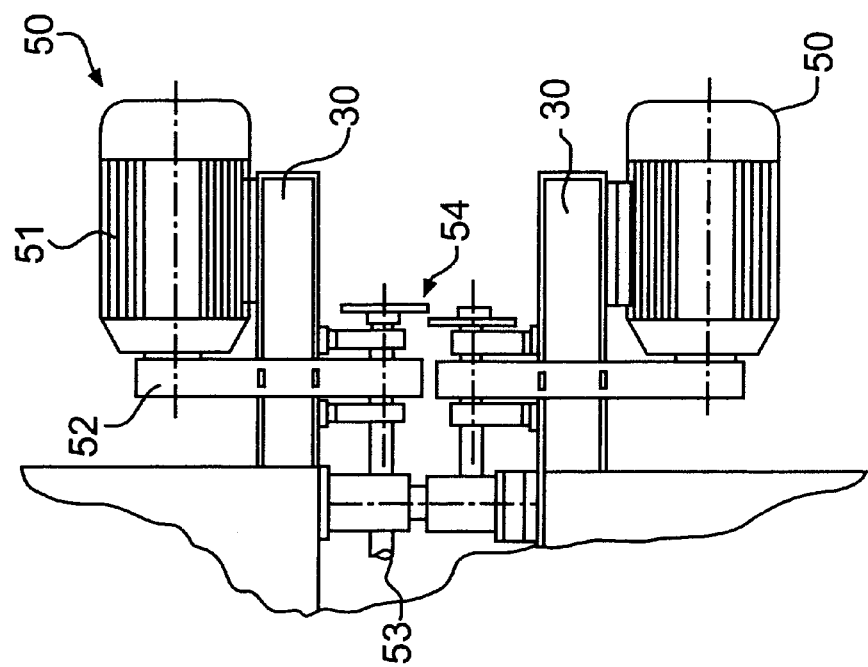
FIG. 6 is a partial side elevation view of the drive modules from the view according to arrow V in FIG. 5.

FIG. 4 shows two modules 1 which are fixedly connected to form one module. This involves simply doubling the unit in comparison with FIG. 4. Reference is made in the following discussion to FIGS. 5 and 6 which already show another assembly step, namely stacking two stands one above the other. Dash-dot lines labeled as 34 indicate an anchoring strap 34 which is preferably permanently cast in the mineral casting. This establishes a circular frictional connection for the main forces from the grinding operation in the shortest possible distance, because the connection is preferably established directly to an integrally cast anchoring plate 35 and adjustable-height supporting columns 36. The supporting columns 36 may be equipped with a spindle that is adjustable by motor. The adjustable-height supporting columns not only have a supporting function but also serve primarily to adjust the gap width for the grinding means. Anchoring strap 34, main cross arm 30 with anchoring bolts 32 and supporting columns 36 form a yoke for each housing module 1 and 2, with the two opposing yokes being connected by the supporting columns 26. The wide-wheel grinding machine also has a first guide and feed unit 37 on the board feed side and a second guide unit 38 on the board discharge side. Both guide and feed units 37 and 38 are modules and have guide rollers 39, with at least one roller being designed as a driven feed roller 40. All the guidance and feed units consist of an upper module 41 and a lower module 42, where the feed rollers with the corresponding guide rollers yield a stable longitudinal and transverse guidance. At the first time startup of operation or after a lengthy operating time, the guide roller sets must be adjusted accurately in height so that the board guides are exactly parallel according to a central grinding plane 43 and are positioned optimally with respect to the grinding means. To this end, each set of guide rollers is anchored by adjustable elements 44. Each grinding head has its own drive module 50 as shown in FIG. 6, consisting of a drive motor 51, a belt 54 and a bearing point 52 plus a drive shaft 53.

FIGS. 7a and 7b illustrate the situation when all the important modules of a 4-head machine have been completely assembled. FIG. 7a shows the view of the operating side, and FIG. 7b shows the view of the drive side, but without the drive modules. In FIG. 7a there is no dividing line between the two housing modules that are at the same height, in contrast with FIG. 7b. This is intended only to indicate that double modules can also be manufactured if necessary. As mentioned above, all known embodiments of the state of the art can be used as the abrasive medium. Reference is made in particular to the German Utility Model G 94 14 952.6 by the present applicant, which is herewith declared to be an integral part of the text of the present patent application.

Figure 9:
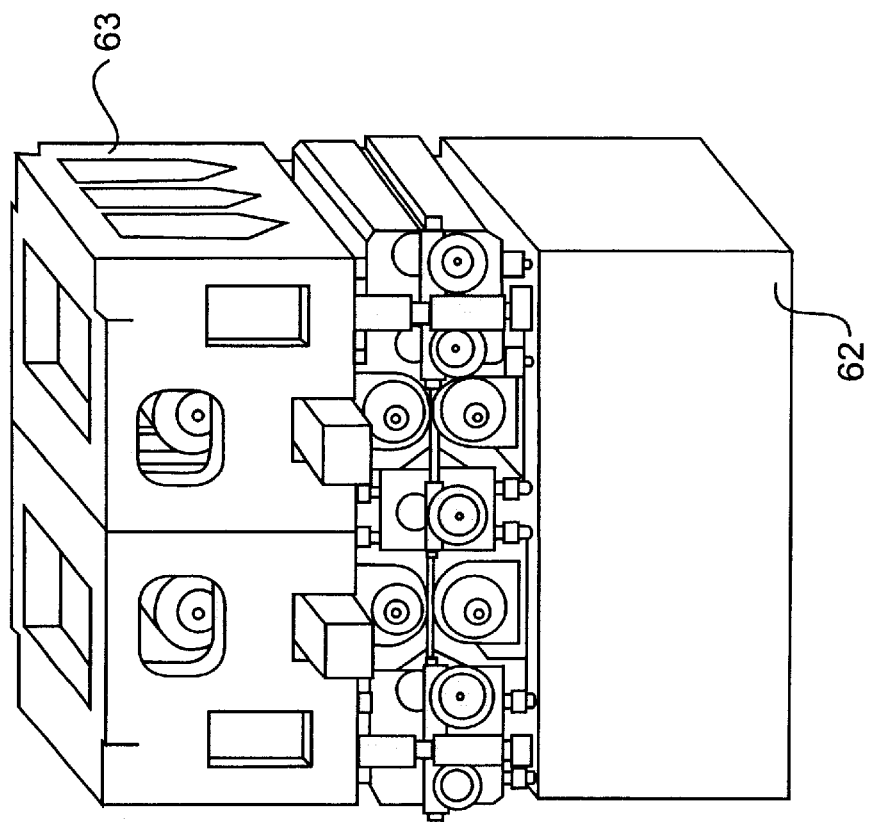
FIG. 9 is a three-dimensional view of a combination of a top part module as a mineral casting and a bottom part as a steel structure.
Figure 8:
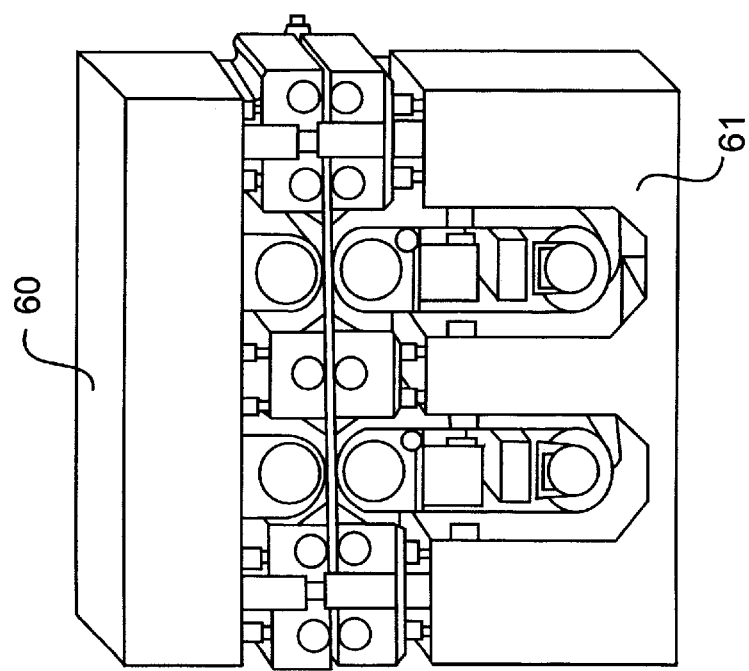
FIG. 8 is a three-dimensional view of a combination of a bottom part module as a mineral casting and a top part as a steel structure.

FIGS. 8 and 9 each show a combined embodiment. In FIGS. 10a–10h, the entire machine bottom part 61 is designed like that in FIG. 7a. Machine top part 60 may be constructed as a traditional steel structure, e.g., with grinding drums as the upper grinding heads. The situation illustrated in FIG. 9 is exactly the opposite. Machine bottom part 62 is produced as a steel structure in the known way, and machine bottom part 63 is produced as a housing module according to the present invention. This should indicate only that the present modular design is not restrictive with regard to the variety of different possible variants. The non-metal casting modules are especially made of the mineral casting components: resin, hardener and a mineral filler. This yields a thermally stable base for optimum operation of the wide-wheel grinding machine with a very great damping effect for vibration in the grinding operation. The raw materials used here consist practically of an inert material composed of siliceous lime and a small amount of epoxy binder and they are resistant to oils, coolant emulsions and many chemicals. The thermal expansion values are similar to those of steel and cast iron but they are combined here with an excellent thermal stability. The vibration damping effect is approximately ten times better than that of cast iron. However, these modules are given their final form as a cold casting material in the casting mold. In the cold casting method, most of the cable and line ducts can also be cast at the same time; likewise, precision connecting parts and guides, supporting plates, yoke elements for the main flow of forces, etc, can also be included. This permits enormous savings of time in assembly.

Figure 10A:
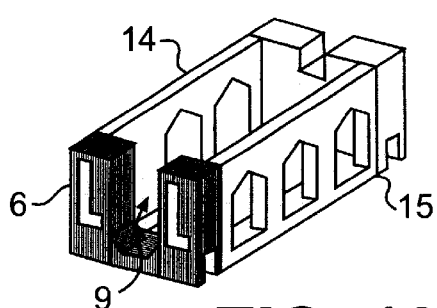
FIGS. 10a–10h are three-dimensional views of various modular combinations.
Figure 10B:
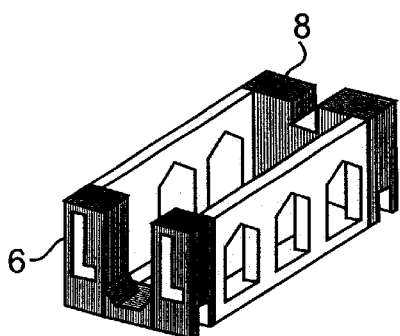
Figure 10C:
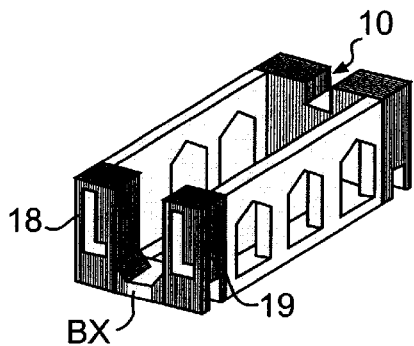
Figure 10D:
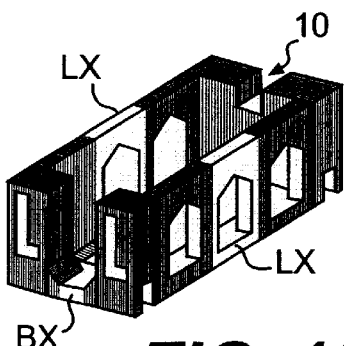
Figure 10E:
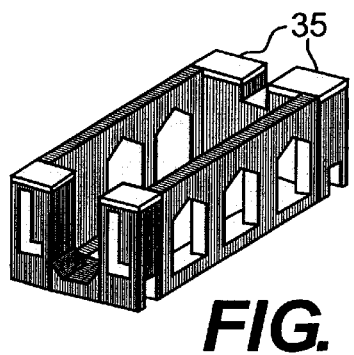
Figure 10F:
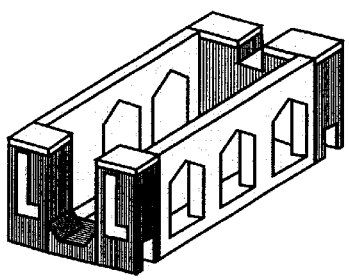
Figure 10G:
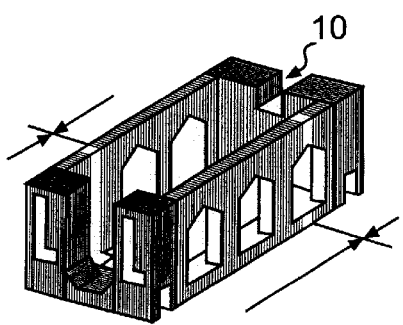
Figure 10H:
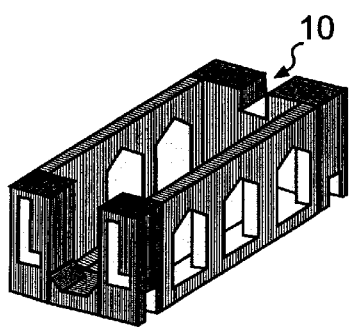

FIGS. 10a through 10h show different embodiments for the mineral casting modules, with the module produced by non-metal casting shown as shaded areas in the figures. As a whole, the module is made of mineral castings and assumes a load-bearing function but especially a damping function. In FIG. 10a, the entire front panel 6 is produced as a non-metal casting, and in FIG. 10b both the front panel 6 and the back panel 8 are produced as mineral castings, for example. This should indicate only that either one can be produced as a mineral casting. The reason for these three variations is to illustrate the possibility of implementing special embodiments. Casting requires minimal standardization. In order not to have to produce a new casting mold for each machine, a width variation piece $B_X$ is proposed according to FIG. 10c. The two longitudinal wall parts 14 and 15 are produced as a traditional steel design, but the corner parts 18 and 19 are shown as mineral castings. Another interesting embodiment is shown in FIG. 10d, where two inserts $L_X$ are made of metal in the longitudinal wall parts in addition to part $B_X$. Thus, FIG. 10d not only allows the greatest possible standardization of modules but also the greatest possible use of mineral castings as components in the modules. Due to the fact that not only the corner parts 18 and 19 but also a part of the longitudinal wall parts is manufactured as a one-piece mineral casting, the overall rigidity is very high. FIGS. 10e and 10f illustrate two examples for the use of anchoring plates 35, which are integrally cast into the corresponding module. FIG. 10g shows another possible embodiment with a two-piece module in an asymmetrical design. The interface is indicated with arrows on both sides. FIG. 10h shows a housing part produced as a non-metal casting on the whole.

All the examples shown here have in common the fact that mainly mineral castings are used in those areas where forces from the grinding heads are transferred directly to the stand or the housing. In the grinding operation, this yields a better surface on the work piece or board to be processed due to the use of a material with a damping effect for the stand. The basic function of inexpensive production is thus achieved here without any sacrifice in terms of quality or the variety of specific client needs that can be met.

What is claimed is:

1. A wide-wheel grinding machine frame comprising:
   a module having at least a portion made of mineral casting; and
   a grinding device supporting cross arm connected to the module portion made out of mineral casting.

2. The machine frame of claim 1, wherein the module portion made of mineral casting comprises resin, hardener, and mineral fillers.

3. The machine frame of claim 1, wherein the cross arm is a tubular beam.

4. The machine frame of claim 1, further comprising a non-metallic cast filling at least a portion of the cross beam connected to the module.

5. The machine frame of claim 4, wherein the non-metallic cast filling is mineral casting.

6. The machine frame of claim 1, wherein the cross arm is made of metal.

7. The machine frame of claim 1, further comprising a grinding motor mounted to the portion of the cross arm connected to the module.

8. The machine frame of claim 1, further comprising a grinding head mounted to the portion of the cross arm connected to the module.

9. The machine frame of claim 1, wherein the cross arm comprises a motor side and an operating side, and the cross arm is connected to the module at both the motor side and the operating side.

10. The machine frame of claim 9, further comprising:
    a grinding motor mounted on the motor side of the cross arm; and
    a grinding head mounted on the operating side of the cross arm.

11. The machine frame of claim 1, wherein the module is configured to be solid locally on the portion connected to the cross arm to increase the mass with respect to other frame parts.

12. The machine frame of claim 1, wherein the module comprises a motor side, an operating side, and a longitudinal side.

13. The machine frame of claim 1, wherein the module comprises a one-piece mineral casting body.

14. The machine frame of claim 1, wherein the module comprises a motor side portion.

15. The machine frame of claim 14, wherein the motor side portion is made of mineral casting.

16. The machine frame of claim 1, wherein the module comprises an operating side portion.

17. The machine frame of claim 16, wherein the operating side portion is made of mineral casting.

18. The machine frame of claim 16, wherein the module further comprises a motor side portion.

19. The machine frame of claim 18, wherein the operating side portion and the motor side portion are connected by two longitudinal wall portions.

20. The machine frame of claim 1, wherein the module comprises a plurality of partial modules.

21. The machine frame of claim 20, wherein at least one of the plurality of partial modules comprises at least a portion of an operating side of the module.

22. The machine frame of claim 21, wherein the operating side partial module is made of mineral casting.

23. The machine frame of claim 20, wherein at least one of the plurality of partial modules comprises at least a portion of a motor side of the module.

24. The machine frame of claim 23, wherein the motor side partial module is made of mineral casting.

25. The machine frame of claim 20, wherein the at least one partial module is made of mineral casting.

26. The machine frame of claim 20, wherein at least one of the plurality of partial modules comprises legs.

27. The machine frame of claim 20, wherein at least one of the plurality of partial modules comprises longitudinal sides of unequal length.

28. The machine frame of claim 20, wherein the partial modules have a uniform height.

29. The machine frame of claim 20, wherein at least one of the plurality of partial modules comprises a width variation piece.

30. The machine frame of claim 20, wherein at least one of the plurality of partial modules comprises anchoring plates.

31. The machine frame of claim 1, wherein the module comprises longitudinal side walls configured as mirror-image mineral castings.

32. The machine frame of claim 1, wherein the module comprises solid intermediate supports.

33. The machine frame of claim 1, wherein the module comprises hollow spaces sized to accommodate pipes and cables.

34. The machine frame of claim 1, wherein the module includes one or more partial modules and steel machine stands.

35. The machine frame of claim 1, wherein the module is solid, and has approximately the same weight as a comparable steel frame part.

36. The machine frame of claim 1, further comprising modular mineral casting building blocks and cooperating metal components including subassemblies configured for guide rolls or supporting rolls, and upright adjustable supporting columns.

37. The machine frame of claim 1, further comprising a plurality of grinding heads, wherein the machine frame includes identical modules according to the number of grinding heads.

38. The machine frame of claim 1, wherein the module has a solid cubical shape with mainly flat bordering faces.

39. A wide-wheel grinding machine comprising at least two machine frames configured as mirror-image parts, the machine frames comprising a module at least a portion of which is made of mineral casting and a grinding device supporting cross arm connected to the module portion made out of mineral casting.

40. A wide-wheel grinding machine comprising a top frame set and a bottom frame set each having two mirror-image machine frames, the machine frames comprising a module at least a portion of which is made of mineral casting and a grinding device supporting cross arm connected to the module portion made out of mineral casting, the module comprising a motor side, an operating side, and a longitudinal side.

\* \* \* \* \*